Jan. 3, 1933.  M. S. PARKHILL  1,893,209
VALVE CAGE
Filed May 11, 1932

INVENTOR.
Mortimer S Parkhill
BY
HIS ATTORNEY.

Patented Jan. 3, 1933

1,893,209

UNITED STATES PATENT OFFICE

MORTIMER S. PARKHILL, OF CORNING, NEW YORK, ASSIGNOR TO INGERSOLL-RAND COMPANY, OF JERSEY CITY, NEW JERSEY, A CORPORATION OF NEW JERSEY

VALVE CAGE

Application filed May 11, 1932. Serial No. 610,743.

This invention relates to valve mechanism, but more particularly to a valve cage adapted for use in connection with internal combustion engines and other similar devices wherein the valve mechanism is subjected to intense heat.

One object of the invention is to maintain the temperature of the valve cage at a value to assure the most favorable operation of the valve wherewith it is associated.

Another object of the invention is to assure circulation of the cooling liquid throughout every portion of the jacketed space or spaces which surround the valve guide and associated parts of the valve cage.

Other objects will be in part obvious and in part pointed out hereinafter.

Figure 1:
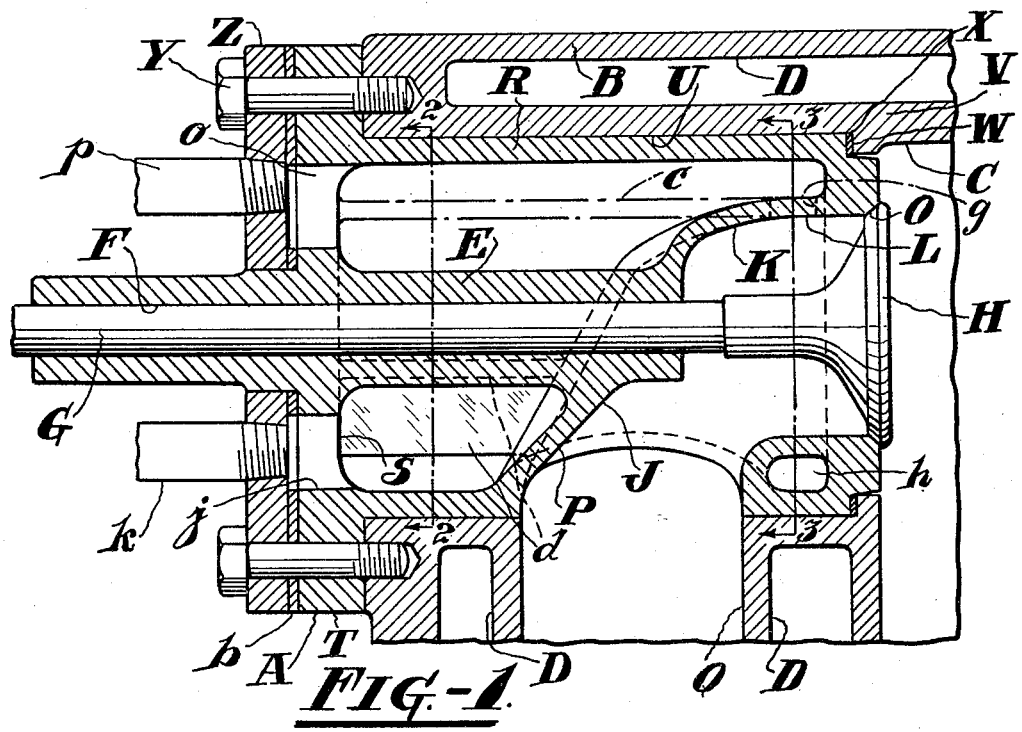
Figure 2:
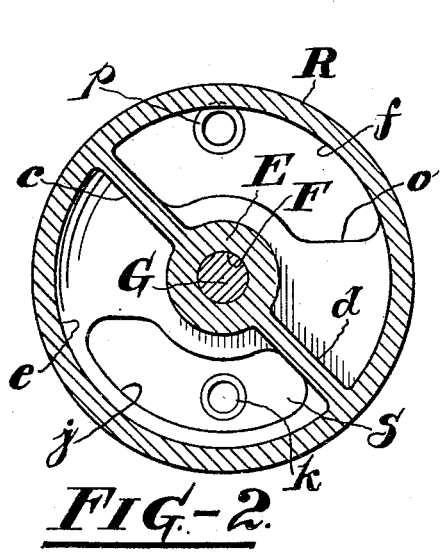
Figure 3:
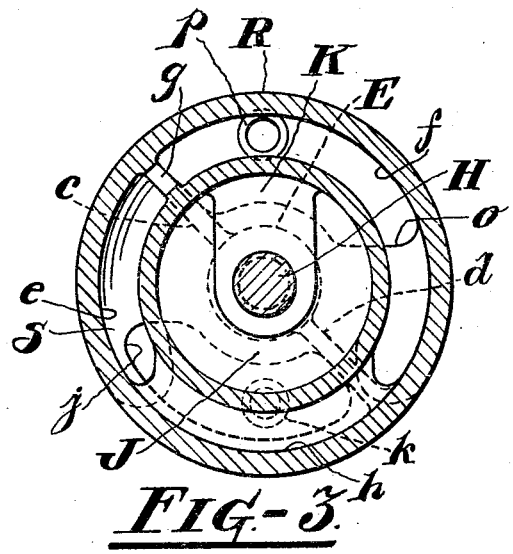

In the accompanying drawing forming a part of this specification and in which similar reference characters refer to similar parts, Figure 1 is a sectional elevation of a valve cage and a portion of an engine to which it is applied, and Figures 2 and 3 are transverse views taken through Figure 1 on the lines 2—2 and 3—3 looking in the directions indicated by the arrows.

Referring more particularly to the drawing, A designates, in general, a valve cage, and B the head of an engine cylinder having a combustion chamber C and chambers or spaces D through which cooling water may circulate for maintaining the temperature of the adjacent walls at a correct value.

The valve cage A, constructed in accordance with the practice of the invention, comprises a guide member E having a bore F to slidably receive the stem G of a valve H which may control the admission of fuel into or the flow of exhaust gases from the chamber C, depending upon whether the valve is being used as an exhaust or inlet valve.

The passage, such as that designated by J, in the valve cage and for fuel or exhaust gases is defined by a conduit K joined to the guide member E and having a portion L concentric with the guide member. At the outer end of the portion L of the conduit is a seating surface O to accommodate the valve H.

The conduit K further consists of a portion P which is angularly disposed with respect to the portion L and that end of the passage J which is defined by the portion P of the conduit K registers with a passage Q in the head B.

Encircling the guide member E and the conduit K is a water jacket R which is joined at one end to the adjacent end of the conduit K and at its opposite end to the guide member E by a wall S which is extended beyond the periphery of the water jacket R to provide a flange T.

Preferably the peripheral surface of the water jacket R fits snugly into a bore U in the head B wherein the valve cage A is disposed, and near the inner end of the valve cage is an external shoulder V between which and a shoulder W in the bore U lies a sealing member or gasket X to prevent leakage of the products of combustion between the cooperating surfaces of the valve cage A and the head B.

The valve cage A may be conveniently secured to the head B by means of bolts Y which extend through the flange T and are threaded into the head B. The bolts Y, moreover, serve to clamp a cover plate Z against the outer end of the flange T and, as illustrated, a gasket b between the cover plate Z and the valve cage.

In order to assure the circulation of cooling water throughout all portions of the interior of the water jacket R the said water jacket is provided with a pair of walls c and d which are joined to the water jacket R and to the guide member E to divide the interior of the water jacket R into a pair of compartments e and f. The walls c and d may lie on diametrically opposite sides of the guide member E and, in the present instance, the wall c extends from one end to the other of the water jacket and is provided at the end adjacent the valve seat O with a port g to permit the passage of water from one compartment to the other. Communication is further provided between the compartments e and f by a restricted portion h of the compartment e and which portion lies between the conduit K and the valve seat O. In the arrangement shown the wall $d$ extends only from the wall S of the valve cage to the angularly disposed portion P of the conduit K.

The compartment $e$, which may be termed the inlet compartment, is provided with an inlet port $j$ located in the wall S and a supply conduit $k$ is threaded into the cover plate Z for introducing water into the compartment $e$. At the outer end of the compartment $f$ and in the wall S is a discharge port $o$ through which the water flows into a discharge pipe $p$ threaded into the cover plate Z.

In practice, water introduced into the compartment and flowing in the direction of the valves seat O circulates around the inclined portion P of the conduit K, thence flows through the restricted portion $h$ of the compartment $e$ and through the port $g$ into the compartment $f$. From the compartment $f$ the water passes through the discharge port $o$ into the pipe $p$ whereby it is conveyed from the valve cage.

From the foregoing description it will be readily apparent that the entire body of water introduced into the water jacket will be maintained constantly in motion to absorb the heat from the valve cage and that there are, therefore, no dead pockets or recesses wherein the water may lie dormant and thus insulate portions of the valve cage from the circulating cooling water.

I claim:

1. A valve cage comprising a guide member, a water jacket encircling the guide member, and means dividing the water jacket into a plurality of communicating compartments.

2. A valve cage comprising a guide member, a conduit on the valve cage, a valve seat at one end of the conduit, a water jacket encircling the guide member and the conduit, and means dividing the water jacket into a plurality of communicating compartments.

3. A valve cage comprising a guide member, a conduit on the valve cage, a valve seat at one end of the conduit, a water jacket encircling the guide member and the conduit, and a wall in the water jacket to divide the water jacket into a pair of compartments and having a passage adjacent the valve seat to afford communication between the compartments.

4. A valve cage comprising a guide member, a conduit on the valve cage, a valve seat at one end of the conduit, a water jacket encircling the guide member and the conduit, a wall in the water jacket to divide the water jacket into a pair of compartments and having a passage adjacent the valve seat to afford communication between the compartments, a supply passage in the casing for the water jacket and opening into one compartment, and a discharge passage in the casing associated with the other compartment for conveying the cooling water from the water jacket.

5. A valve cage comprising a guide member, a water jacket encircling the guide member, walls dividing the water jacket into a plurality of compartments, an inlet passage for water and opening into an end of one compartment, a water outlet passage at the same end of another compartment, and a passage in the wall affording communication between the other ends of the compartments.

In testimony whereof I have signed this specification.

MORTIMER S. PARKHILL.